Sept. 27, 1966  R. S. CATALDO  3,274,777
WAVE ENGINE GASIFIER
Filed July 12, 1965

INVENTOR.
Roy S. Cataldo
BY
J. L. Carpenter
ATTORNEY

United States Patent Office 3,274,777
Patented Sept. 27, 1966

3,274,777
WAVE ENGINE GASIFIER
Roy S. Cataldo, Birmingham, Mich., assignor to General Motors Corporation, Detroit, Mich., a corporation of Delaware
Filed July 12, 1965, Ser. No. 471,006
14 Claims. (Cl. 60—39.77)

This invention relates to internal combustion gasifiers and more particularly to gasifiers of the wave engine type wherein shock waves in the chamber are utilized to compress the charge and perform the exhaust and intake functions.

Wave engine gasifiers of the type herein disclosed serve to generate a supply of pressurized fluids including combustion products which may be utilized in various applications such as to supply turbines or other pressure fluid actuated devices.

While various forms of wave engine gasifiers have been previously proposed, they have failed to attain any substantial degree of commercial success due to the relatively low efficiency and other shortcomings of the prior art arrangements.

It is, for instance, known in such devices to provide for alternately occurring explosions taking place at opposite ends of a central duct. This arrangement creates severe unbalance problems which render the device unsuitable for use in most mobile and many stationary applications. Also in such applications the compressed gases are generally removed from the center of the duct, requiring the burned fluids to move half the length of the duct from the points of combustion before being exhausted.

Furthermore, in devices of this type it has not been possible to obtain precompression ratios greater than approximately 2½ to 1. This has resulted in relatively inefficient cycles of operation. Finally, the use of mechanically actuated or timed valves and ignition devices has resulted in additional losses due to the somewhat erratic flow processes occurring in these devices.

The present invention proposes a configuration for a wave engine gasifier which solves many of the problems of prior art devices while providing for operation at higher efficiency. This is accomplished first by providing for combustion in the center of a combustion duct thus generating equal shock waves acting in opposite directions and resulting in a perfectly balanced machine.

Exhaust of the combustion gases also takes place from the center of the duct and therefore does not require moving the burned gases half the length of the chamber as in the prior devices. Furthermore, the exhaust process is controlled by actuating the exhaust valve with the force of one of the shock waves as it reaches one end of the duct. The shock waves are reflected from the ends of the duct and cause elimination of the burned gases from the center of the duct while expansion waves, following the shock waves, draw in fresh air through valve means at the ends of the duct.

The meeting of the reflected shock waves at the center of the duct provides a sufficiently high precompression pressure to create a detonating diesel type combustion without electrical ignition when a proper fuel is injected into the duct central portion. Such detonative type combustion gives very high flame speeds and thus results in shock waves having a substantially higher energy level than those developed in previous machines. Because of this increased energy level, higher precompression pressures result, giving more efficient combustion and developing higher gas pressures in the exhaust.

The various objects and advantages of the invention and the manner in which they may be obtained may be better understood by reference to the following description of one embodiment of my invention taken together with the partially diagrammatic drawings forming a part thereof in which.

Figure 1:
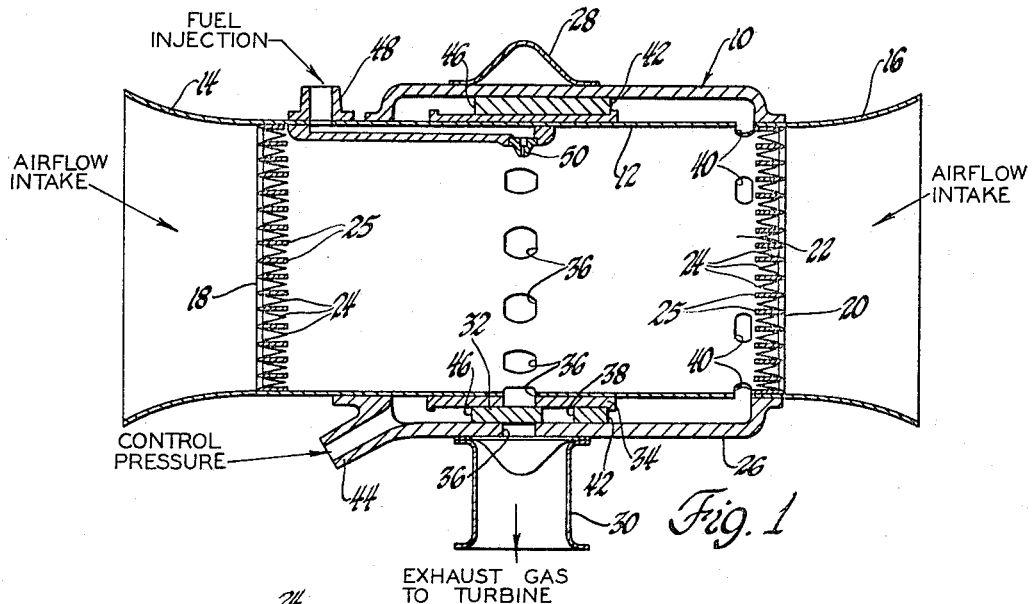
FIGURE 1 is a longitudinal sectional view of one form of wave engine gasifier according to the invention.

Referring now to the drawings, FIGURE 1 generally illustrates a wave engine gasifier 10 formed according to the invention and comprising a tubular duct member 12 of generally circular cross section and having outwardly flared end portions 14 and 16, respectively. At opposite ends of the duct but inside the flared end portions are located a pair of end walls 18 and 20 which combine with the duct 12 to define a generally cylindrical chamber 22. Each of the end walls 18, 20 is provided with inlet valve means 24.

Figure 2:
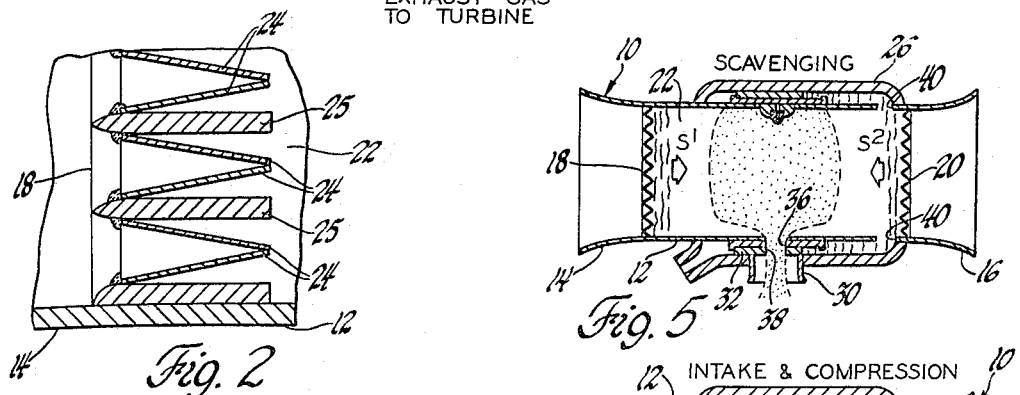
FIGURE 2 is a fragmentary enlargement of a portion of FIGURE 1 showing a proposed inlet valve of structure.

The structure of the end walls and inlet valve means utilized in the present embodiment is best shown in FIGURE 2 where the wall 18 is seen to comprise an open lattice structure carrying a plurality of flapper valves 24. The valves are shown in their closed positions and are adapted to open by deflecting against guide members 25 whenever the pressure in chamber 22 adjacent the valves is less than ambient.

Surrounding a portion of duct member 12 is an exhaust valve housing 26 carrying an annular collector member 28 mounted intermediate the end walls and terminating in an exhaust outlet 30. Within housing 26 is an annular exhaust valve ring 32 which surrounds the center of the duct and is axially slidably mounted between the valve housing 26 and an annular mounting ring 34 carried on the outer surface of duct member 12. A plurality of exhaust openings or passages 36 are peripherally spaced around the center of duct 12, equidistant from the end walls 18 and 20, and extend through ring 34 and housing 26 to connect chamber 22 with collector member 28. Complementary openings 38 in exhaust valve 32 are adapted to be aligned with openings 36 when valve 32 is displaced axially to its extreme leftward position as viewed in FIGURE 1, at which time exhaust gases can pass out of the chamber 22 and into the exhaust collector. When the valve is displaced to its extreme rightward position as shown in the figure, however, it closes the passages 36 and prevents the passage of exhaust gases therethrough.

In order to provide for controlling movements of the exhaust valve, the interior of housing 26 is connected with chamber 22 adjacent wall 20 by a plurality of peripherally spaced openings or passages 40 so that pressure from the chamber can enter housing 26 and act against the right end 42 of valve member 32. At the other end of housing 26 connecting means 44 are provided for introducing an external control pressure into the housing to act against the left end 46 of valve member 32. The arrangement is such that the valve is normally held closed by the control pressure and is opened only when the shock wave pressure entering the housing 26 through ports 40 is sufficient to open the valve against the force of the control pressure.

In order to supply atomized fuel to the center of chamber 22, the gasifier is also provided with fuel injection means 48 which terminate in a spray nozzle 50 located in the duct adjacent the location of the exhaust openings 36.

Figure 3:
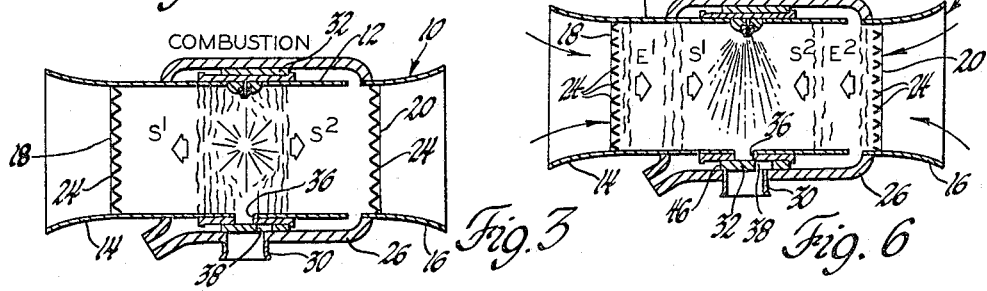

The operation of the wave engine gasifier is best explained by reference to the diagrammatic views of FIGURES 3 through 6. FIGURE 3 represents the combustion portion of the cycle. Injection of suitable diesel fuel into a precompressed charge of air at the center of duct 12 causes an explosion, or detonative burning, to occur sending a pair of high energy shock waves, $S^1$ and $S^2$, moving in opposite directions towards the end walls 18 and 20.

Figure 4:
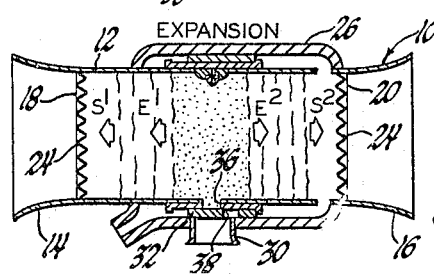

As is shown in FIGURE 4, the shock waves $S^1$ and $S^2$ are followed by a pair of expansion waves $E^1$ and $E^2$ which result from the expansion of the burned gases.

Figure 5:
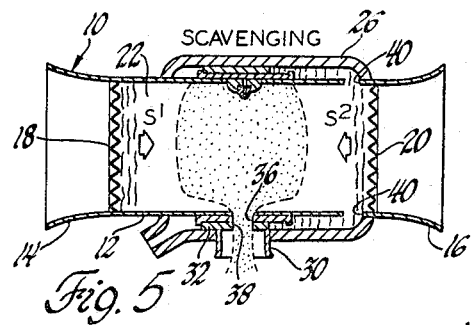
FIGURES 3, 4, 5 and 6 are diagrammatic representations of various events in the combustion cycle of the engine.

When the shock waves reach the intake flapper valves at end walls 18 and 20, as shown in FIGURE 5, the high pressure holds the valves closed and the shock waves are reflected back towards the center of the duct. At the same time, pressure from shock wave $S^2$ enters the exhaust valve housing through openings 40 and forces the valve member 32 leftwardly, opening the valve. This permits the returning shock waves $S^1$ and $S^2$ to force the burned gases out from the center of chamber 22 through exhaust openings 36.

Figure 6:
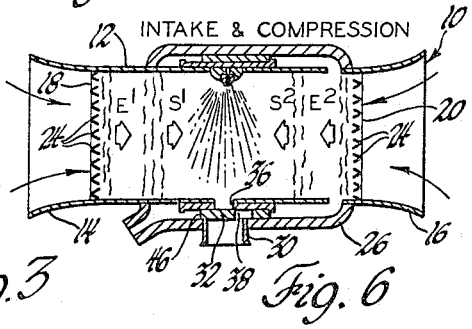

Following this, as seen in FIGURE 6, the expansion waves following shock waves $S^1$ and $S^2$ reduce the pressure at the ends of the duct to below ambient, allowing the exhaust valve to be closed by control pressure acting on its opposite end 46 and drawing fresh charges of air into the ends of the duct through flapper valves 24.

Also at this time, the burned exhaust products have been exhausted from the center portion of the duct leaving therein a charge of fresh air which entered the duct through the intake valves on a previous cycle. The closing of the exhaust valve permits this charge of fresh air to be compressed by shock waves $S^1$ and $S^2$ which approach one another and meet at the center of the cylinder causing the charge to be compressed momentarily to a high pressure. At this point, fuel is again injected into the precompressed charge of air and the cycle is repeated.

Preferably the fuel injection means is controlled by a pressure signal from the interior of the duct so that fuel will be injected at the most opportune moment during each cycle. Such control is provided for the exhaust valve operation by the previously described manner of using the shock wave pressure for operating the valve. Timing of the exhaust valve opening to obtain the optimum operating conditions may be accomplished by suitably positioning the port 40 in relation to end wall 20 and by suitably locating the position of right end 42 of the valve ring 32 with respect to the openings 40. While it is contemplated that a constant control pressure would be connected to connecting means 44, so as to act on the left end 46 of valve 32, it might be possible under certain conditions to utilize pressure from the central portion of the duct for this purpose. Suitable spring biasing means or their equivalent could equally well be used.

The proper use of the working pressures within the gasifier duct to control the exhaust valve and fuel injection functions adds materially to the efficiency of the present arrangement, since the timing of these functions is automatically compensated for variations in burning and other variables which make the flow processes within the gasifier somewhat erratic.

The use of detonative combustion, made possible by the high compression pressures caused by the collision of two shock waves at the center of the chamber, is also an important reason for the high efficiency which may be obtained in gasifiers made according to the present invention. While this type combustion is believed to be best obtained by the spontaneous combustion of suitable diesel fuel injected into the compressed gases, the invention also contemplates the use of suitable ignition means to ignite fuel injected or otherwise delivered into the center of the combustion chamber.

As previously noted, the present arrangement makes for a completely balanced pattern of shock wave movement and thus results in a device which would be particularly suitable for installation in a vehicle or other application which might be sensitive to vibration.

While the description and operation of the invention have been disclosed herein in relation to a particular embodiment, it is expected that those skilled in the art will be enabled thereby to make many variations or changes within the scope of the invention herein presented. It is accordingly intended that the invention should not be limited except as defined by the appended claims.

I claim:
1. An internal combustion wave engine gasifier comprising:
   a duct having at least one side wall and a pair of end walls defining a chamber, said chamber having a central portion approximately equidistant from said end walls and adapted to receive a charge of air,
   fuel supplying means to deliver a charge of fuel to said chamber central portion for combustion with said air charge, whereby a pair of oppositely directed pressure waves of substantially equal intensity are caused to move outwardly from said central portion, striking said end walls and being at least partially reflected back toward said central portion, said pressure waves being followed by a pair of expansion waves,
   exhaust means in said side wall and connecting with said chamber central portion, said exhaust means being openable to permit said reflected pressure waves to force the combustion gases from said central portion and deliver a fresh air charge thereto and said exhaust means being closable to retain said fresh air charge in said central portion and permit said reflected pressure waves to precompress said fresh air charge prior to delivery of an additional charge of fuel for combustion in said central portion, and
   fresh air inlet means in each of said end walls and being openable to permit said expansion waves to draw fresh air into said chamber ends for movement to said chamber central portion during a subsequent cycle.

2. The device of claim 1 wherein said fuel supplying means comprise a liquid fuel injector having an atomizing spray nozzle in said chamber central portion.

3. The device of claim 2 and further including means to actuate said fuel injector in response to the action of the pressure waves in said chamber whereby compensation for erratic pressure wave motion is automatically obtained.

4. The device of claim 1 and further including means to actuate said exhaust means in response to the action of the pressure waves in said chamber whereby compensation for erratic pressure wave motion is automatically obtained.

5. The device of claim 1 wherein said exhaust means comprise plural exhaust passage means peripherally spaced around said chamber central portion, an annular valve ring surrounding said passage means and axially slidable to control the opening and closing thereof, means for normally urging said valve ring in a closing direction and means to open said valve in response to the action of the pressure waves in said chamber whereby compensation for erratic pressure wave motion is automatically obtained.

6. The device of claim 5 wherein said valve opening means includes second passage means through said duct side wall adjacent one of said end walls and communicating the interior of said chamber with one end of said valve ring whereby pressure from said pressure waves may act directly to open said valve means.

7. The device of claim 6 and further including third passage means communicating with another end of said valve ring opposite said one end and including a fluid pressure connection whereby a control pressure may be applied to said valve ring another end to urge said valve ring in a closing direction.

8. The device of claim 4 and further including means to actuate said fuel supplying means in response to the action of the pressure waves in said chamber.

9. The device of claim 1 and further including means to actuate said fresh air inlet means in response to the action of the pressure and expansion waves in said chamber whereby compensation for erratic wave motion is automatically obtained.

10. The device of claim 9 and further including means to actuate said exhaust means in response to the action of the pressure waves in said chamber.

11. The device of claim 10 and further including means to actuate said fuel supplying means in response to the action of pressure waves in said chamber.

12. The device of claim 9 wherein said fresh air inlet means comprise a plurality of pressure responsive flapper valves arranged to permit fluid to enter said chamber through said end walls but to prevent fluid flow therethrough in the opposite directions.

13. A wave engine gasifier comprising:
   a cylindrical duct having a peripheral wall and a pair of end walls enclosing a chamber,
   a plurality of pressure actuated one-way inlet flapper valves in each of said end walls and adapted to admit air to the ends of said chamber whenever the pressure in said chamber adjacent said flapper valves is substantially below ambient,
   a plurality of exhaust opening means annularly spaced around said peripheral wall intermediate said end walls and equidistant therefrom,
   an axially reciprocable annular exhaust valve surrounding said valve opening means to control the passage of exhaust products therefrom and
   fuel injection means including a fuel spray nozzle, in said chamber equidistant from said end walls and adapted to supply fuel to said chamber at substantially the moment of peak compression caused by shock waves meeting at the center of said chamber whereby to cause detonative combustion of said fuel and start a pair of oppositely directed compression shock waves toward said end walls.

14. A wave engine gasifier comprising:
   a cylindrical duct having a peripheral wall and a pair of end walls enclosing a chamber,
   a plurality of pressure actuated one-way inlet flapper valves in each of said end walls and adapted to admit air to the ends of said chamber whenever the pressure in said chamber adjacent said flapper valves is substantially below ambient,
   a plurality of exhaust opening means annularly spaced around said peripheral wall intermediate said end walls and equidistant therefrom,
   an axially reciprocable annular exhaust valve surrounding said valve opening means to control the passage of exhaust products therefrom,
   control pressure receiving means adapted to direct a control pressure against said exhaust valve to bias said exhaust valve in a closing direction,
   connecting means adjacent one end of said duct to connect the end of said chamber with said exhaust valve to allow pressure from said chamber to open said exhaust valve against said control pressure and
   fuel injection means including a fuel spray nozzle, in said chamber equidistant from said end walls and adapted to supply fuel to said chamber at substantially the moment of peak compression caused by shock waves meeting at the center of said chamber whereby to cause detonative combustion of said fuel and start a pair of oppositely directed compression shock waves toward said end walls.

References Cited by the Examiner
UNITED STATES PATENTS 2,627,163  2/1953  Anderson _____ 60—39.77
2,647,364  8/1953  Dreibelbis _____ 60—39.8

MARK NEWMAN, *Primary Examiner.*

R. D. BLAKESLEE, *Assistant Examiner.*